US011920088B2

(12) United States Patent
Patten et al.

(10) Patent No.: US 11,920,088 B2
(45) Date of Patent: Mar. 5, 2024

(54) LOW TEMPERATURE HOMOGENEOUS CHARGE CONTINUOUS OXIDATION PYROLYSIS OF CARBON ORES

(71) Applicant: Red Leaf Resources, Inc., Salt Lake City, UT (US)

(72) Inventors: James Patten, Salt Lake City, UT (US); James Bunger, Salt Lake City, UT (US); John Faull, Salt Lake City, UT (US); Jeremy Pearson, Salt Lake City, UT (US)

(73) Assignee: Red Leaf Resources, Inc., Salt Lake City, UT (US)

( * ) Notice: Subject to any disclaimer, the term of this patent is extended or adjusted under 35 U.S.C. 154(b) by 138 days.

(21) Appl. No.: 17/554,163

(22) Filed: Dec. 17, 2021

(65) Prior Publication Data
US 2022/0333014 A1  Oct. 20, 2022

Related U.S. Application Data

(60) Provisional application No. 63/176,645, filed on Apr. 19, 2021.

(51) Int. Cl.
*C10B 57/04* (2006.01)
*B01J 19/00* (2006.01)
*C10B 57/14* (2006.01)

(52) U.S. Cl.
CPC .......... *C10B 57/04* (2013.01); *B01J 19/0013* (2013.01); *C10B 57/14* (2013.01);
(Continued)

(58) Field of Classification Search
CPC ...... C10B 57/04; C10B 57/14; B01J 19/0013; B01J 2219/00033; B01J 2219/0004; B01J 2219/00123
See application file for complete search history.

(56) References Cited

U.S. PATENT DOCUMENTS 2,481,051 A   9/1949  Uren
3,586,377 A   6/1971  Ellington
(Continued)

OTHER PUBLICATIONS

Written Opinion for International Application Serial No. PCT/US21/63996 dated Mar. 10, 2022, 4 pages, United States.

*Primary Examiner* — Latosha Hines
(74) *Attorney, Agent, or Firm* — Thorpe North & Western, LLP.

(57) ABSTRACT

A method of continuously recovering hydrocarbons from carbon ores can include providing first and second vessels containing rubblized carbon ore. A cooling fuel gas can be introduced into the first vessel. The cooling fuel gas can include oxygen and a recycle gas from the second vessel, which includes hydrocarbons and oxidation products. The oxygen can be consumed through oxidation in an oxidation zone in the first vessel. The temperature of the oxidation zone can be controlled by limiting the oxygen concentration in the cooling fuel gas. This can produce a hot oxidation product gas that heats rubblized carbon ore in a pyrolysis zone downstream of the oxidation zone. Gaseous and vapor hydrocarbons can be produced in the pyrolysis zone. The vapor hydrocarbons can be condensed in a condensing zone downstream of the pyrolysis zone and then collected. The remaining gaseous hydrocarbons and oxidation products can be recycled as the recycle gas. The oxidation zone and the pyrolysis zone can continuously move through the rubblized carbon ore in a downstream direction. Optionally, by using nitrogen free oxygen for the oxidation, a nitrogen free stream of carbon dioxide is produced suitable for carbon dioxide capture and management. This can also eliminate the production of NOx in the oxidation process.

26 Claims, 7 Drawing Sheets

(52) U.S. Cl.
CPC .............. *B01J 2219/00033* (2013.01); *B01J 2219/0004* (2013.01); *B01J 2219/00123* (2013.01)

(56) References Cited

U.S. PATENT DOCUMENTS

| | | |
|---|---|---|
| 4,147,388 A | 4/1979 | French |
| 4,285,547 A * | 8/1981 | Weichman ............ E21B 43/247 166/259 |
| 2018/0155639 A1* | 6/2018 | Al-Ghamdi ............ C10G 45/00 |

* cited by examiner

100

110 — providing a first vessel containing rubblized carbon ore and a second vessel containing rubblized carbon ore, wherein a gas outlet of the first vessel is connected to a gas inlet of the second vessel to allow gas to flow from the first vessel to the second vessel, and wherein a gas outlet of the second vessel is connected to a gas inlet of the first vessel to allow a recycle gas to flow from the second vessel to the first vessel

120 — introducing a cooling fuel gas into the first vessel, wherein the cooling fuel gas comprises the recycle gas mixed with oxygen, wherein the recycle gas comprises hydrocarbons and oxidation products

130 — consuming the oxygen through oxidation in an oxidation zone at an oxidation temperature in the first vessel, thereby producing a hot oxidation product gas at the oxidation temperature

140 — heating rubblized carbon ore in a pyrolysis zone downstream of the oxidation zone using the hot oxidation product gas, wherein the pyrolysis zone is at a pyrolysis temperature that is less than the oxidation temperature, thereby producing gaseous and vapor hydrocarbon pyrolysis products

150 — condensing the vapor hydrocarbon pyrolysis products on rubblized carbon ore in a condensing zone downstream of the pyrolysis zone, wherein the condensing zone is at a condensing temperature below a boiling point of the vapor hydrocarbon pyrolysis products

160 — collecting the condensed hydrocarbon pyrolysis products

170 — recycling remaining gaseous hydrocarbons and oxidation products from the gas outlet of the second vessel as the recycle gas, wherein the oxidation zone and pyrolysis zone continuously move through the rubblized carbon ore in the downstream direction

LOW TEMPERATURE HOMOGENEOUS CHARGE CONTINUOUS OXIDATION PYROLYSIS OF CARBON ORES

RELATED APPLICATION

This application claims priority to U.S. Provisional Application No. 63/176,645, filed Apr. 19, 2021 which is incorporated herein by reference.

BACKGROUND

Retorting (e.g. pyrolysis) of carbon ores such as, but not limited to, oil shale and coal, typically occurs at elevated temperatures in the absence of oxygen in order to convert organic content or other complex native hydrocarbons into liquid and gaseous products.

Typically these processes are high temperature processes, requiring and absorbing energy both for pyrolysis and for other high temperature simultaneous reactions (e.g. mineral decomposition such as decarbonation and dehydration reactions, etc.) as well as energy required to raise all constituent and process hardware to a desired process temperature. In addition, heat losses to the environment are high, in direct proportion to process temperature and the time at that temperature. Therefore, the high temperature pyrolysis and associated mechanisms absorb most or all of the heat produced by combustion in many pyrolysis processes. As a result, total process heat requirements are large for these processes. This heat may be supplied from the oil shale deposit constituents themselves, without importing energy, if energy efficiency is sufficient. The energy required for pyrolysis and other attendant reactions is much less than is available from non-condensable gas products of these reactions.

The heat required for pyrolysis of hydrocarbon ores is often obtained by combusting hydrocarbon fuels (either the ores themselves, products of the ores, or imported hydrocarbon fuels) in such a manner as to produce combustion temperatures much higher than required for pyrolysis. This high temperature combustion environment is then used to heat a working fluid (which requires a heat exchange system external to the pyrolysis vessel) or to heat the hydrocarbon ore directly, in which case the ores are heated to higher temperature than is optimal for product yield and quality. In addition, in the interests of fuel efficiency, when gases of combustion directly heat ores, combustion is conventionally accomplished with excess oxygen, so that all fuel is utilized in the heating process. In typical direct-heated retorts oxygen mixes with retort products and reduces process yields and degrades product quality.

Modern industrial processes will require carbon dioxide management. Conventional carbon ore pyrolysis processes produce carbon dioxide during the combustion for generation of heat in a dilute (predominantly nitrogen) gas stream. Capture of this carbon dioxide requires significant energy and cost.

SUMMARY

The oxidation process as proposed in this invention can produce carbon dioxide in a gas stream free of nitrogen. This can eliminate costs associated with carbon dioxide separation from the exhaust stream. It also can eliminate the production of NOx in the oxidation process. The present disclosure describes methods of continuously recovering hydrocarbons from carbon ores. These methods can be performed using multiple vessels (i.e., two or more) containing rubblized carbon ore. In some examples, a method can include providing a first vessel containing rubblized carbon ore and a second vessel containing rubblized carbon ore. The first vessel can include a gas outlet, which is connected to a gas inlet of the second vessel to allow gas to flow from the first vessel to the second vessel. The second vessel can include a gas outlet that is connected to a gas inlet of the first vessel to allow a recycle gas to flow from the second vessel to the first vessel. The method can also include introducing a cooling fuel gas into the first vessel. The cooling fuel gas can include the recycle gas from the second vessel mixed with oxygen. The recycle gas can include hydrocarbons and oxidation products. The oxygen in the cooling fuel gas can be consumed through oxidation in an oxidation zone in the first vessel. The oxidation zone can be at an oxidation temperature, and the oxidation process in the oxidation zone can produce a hot oxidation product gas at the oxidation temperature. The hot oxidation product gas can flow downstream through the first vessel and/or second vessel to heat rubblized carbon ore in a pyrolysis zone downstream of the oxidation zone. The pyrolysis zone can be at a pyrolysis temperature that is less than the oxidation temperature. This can produce gaseous and vapor hydrocarbon pyrolysis products. The vapor hydrocarbon pyrolysis products can be condensed on rubblized carbon ore in a condensing zone downstream of the pyrolysis zone within the same vessel or in a subsequent vessel. The condensing zone can be at a condensing temperature below a boiling point of the vapor hydrocarbon pyrolysis products. The condensed hydrocarbon pyrolysis products are then collected, and remaining gaseous hydrocarbons and oxidation products are recycled from the gas outlet of the second vessel as the recycle gas. Excess gaseous hydrocarbons and oxidation products can be drawn off for beneficial use. This process is controlled so that the oxidation zone and the pyrolysis zone continuously move through the rubblized carbon ore in the downstream direction.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 1 is a flow diagram showing a method of continuously recovering hydrocarbons from carbon ores in accordance with one example.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural references unless the context clearly dictates otherwise. Thus, for example, reference to "a vessel" includes reference to one or more of such systems and reference to "the inlet" refers to one or more of such devices.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, the terms "oxidation temperature," "pyrolysis temperature," "cooling temperature," "condensation temperature," and the like are meant to signify those temperatures at which reaction rates or mass or heat transfer are occurring at rates to completion measured in minutes to hours, not days for given vessel sizes, blower sizes, heat duties, etc., and are not meant to limit those reactions or activities to within those temperature ranges.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Methods of Continuously Recovering Hydrocarbons from Carbon Ores

Many batch processes have been used for pyro-processing of solids, such as heating carbon ores to extract hydrocarbons. Batch processes are inherently discontinuous. In many batch processes, a reactor is filled with solids, then heated to a desired temperature and held at the desired temperature until the desired reaction is complete, cooled, and the solids are removed. Any produced liquids and gases can be removed as they are produced. Such a batch process is usually repeated as frequently as possible. In this type of process, the product of liquids and gases is cyclical, there is no valuable production from the reactor during heatup or cooldown or emptying/refilling, and the majority of the heat used in the process is lost with each batch.

Fully continuous processes, on the other hand, involve the continuous introduction of solids into the reactor. The solids are heated as they pass through the reactor, then cooled and discharged. Such a process can overcome the cyclical nature of batch processes, and often the heat can be better utilized in a continuous process. Liquids and gases can be continuously removed from the reactor as they are produced. The heat profile can be fairly constant as solids move through the reactor. However, it can be difficult to operate continuous processes with solid materials due at least in part to difficulties associated with maintaining a seal between the reactor and the surrounding atmosphere at points of ingress and egress of solids. The motion of the solid material can lead to increased contamination of liquids with solids. It can also be difficult to coalesce aerosols in the gases. These processes can also be highly sensitive to operational upsets.

The present invention involves processes that combine some beneficial features of batch processing and some beneficial features of continuous processing. In the methods described herein, the cyclical nature of batch processing and the lost heat are diminished and the operational difficulties of continuous processing are reduced or virtually eliminated. The methods described herein utilize multiple reactor vessels filled with carbon ore. The vessels are connected by gas lines and valves that allow gas to flow from one vessel to the next. Thus, hot gases providing heat for the process can continuously move through the carbon ore in the vessels. Liquid hydrocarbon products can also be collected continuously from the vessels. Thus, the heat, gas, and liquid components of the process operate similar to a fully-continuous process. The solids are introduced and removed in a way similar to a batch process, by emptying and refilling the vessels. The carbon ore is stationary within a vessel while being actively heated and while products are extracted from the carbon ore. However, the vessels are emptied and refilled after the carbon ore inside has been fully processed and cooled, and the gas valves have been closed to that particular vessel. Thus, the difficulties with allowing gases to escape from the process to the atmosphere are eliminated.

As mentioned above, many processes for recovering hydrocarbons from carbon ores, such as oil shale, involve burning a fuel to provide heat to pyrolyze the carbon ore. This combustion of fuel is often performed using stoichiometric oxygen or an excess of oxygen, which results in high combustion temperatures. In some cases the recycle gases are oxidized, in other cases a portion of the carbon is oxidized, in some cases both. Hot combustion gases from either of these two oxidation processes can be used to heat the carbon ore. However, the presence of oxygen during pyrolysis can lead to degradation of the carbon ore and the hydrocarbon products produced through pyrolysis. Additionally, combustion conditions are often not uniform spatially since fuel and oxygen concentrations can vary widely (spatially) from very fuel rich to very fuel lean. While average gas temperature may be readily controlled to a specified temperature, in particular, by managing fuel-to-air ratio, temperature locally at any given point in time tends to vary widely. This temperature control can be used to eliminate undesirable reactions such as thermal decomposition of carbonates and production of thermal NOx.

Further, if fuel is multiphase, local variations in fuel-to-air ratio, stoichiometry, and local temperature are even more difficult or impossible to avoid.

In some examples of the present invention, a sub-stoichiometric amount of oxygen can be used during oxidation to limit the oxidation temperature (e.g. to avoid high temperature combustion). This can provide hot oxidation product gases at a lower temperature, which can be more suitable for pyrolysis of carbon ores to produce the highest quality hydrocarbon products. Additionally, the oxygen can be depleted during oxidation so that the carbon ores that are being pyrolyzed downstream are not degraded by excess oxygen. Gaseous mixtures of fuel, oxygen, and non-participating constituents will begin to oxidize at a meaningful rate at some minimum temperature based on achieving rates to completion measured in minutes to hours, not days. Above such minimum temperature, increasing oxygen concentration will release increasing heat and combined with the heat capacity properties of the gaseous mixture, carbon ore, and with due consideration of any chemical endotherms/exotherms result in a higher temperature. As a general guideline, the oxidation temperature can be less than 50° F. above the minimum temperature, and in some cases less than 10° F. above the minimum temperature.

In the methods of the present invention, a well-mixed (homogeneous) gaseous mixture of oxygen, hydrocarbons, and oxidation products can flow into the vessels containing rubblized carbon ore mentioned above. The gaseous mixture can contact a zone of carbon ore within one of the vessels that is at a temperature above the oxidation temperature of the gaseous mixture. As the gaseous mixture contacts and passes over a hot previously combusted zone of carbon ore within one of the vessels, it absorbs heat and approaches temperatures at which kinetically meaningful oxidation can occur. Oxidation can begin in this zone, and the oxidation reaction can provide heat to continuously keep the temperature in this zone within an oxidation temperature range for the gaseous mixture until all oxygen is consumed. This zone is referred to as the oxidation zone. Due to the constant flow of gas through the vessel, the oxidation zone continuously moves in a downstream direction. For example, the oxidation zone can start at the top of a downflow vessel and then gradually move downward to the bottom of the vessel. The gaseous mixture entering the vessel can be introduced at a lower temperature than the oxidation zone. Therefore, the oxidation zone can move downward and the gaseous mixture can cool the carbon ore that has previously been in the oxidation zone, thereby absorbing heat into the gas. Because of this cooling effect, this gaseous mixture is referred to as a "cooling fuel gas" in the present disclosure.

The cooling fuel gas can include gas recycled from a location farther downstream in the process. This recycle gas can include oxidation products that are produced in the oxidation zone and gaseous hydrocarbons and other gases that are produced from pyrolysis of the carbon ore. The recycle gas can be mixed with oxygen to make the cooling fuel gas. In certain examples, the cooling fuel gas can include unburned hydrocarbons, hydrogen, $CO_2$, CO, $H_2O$, $H_2S$, $SO_x$, and oxygen. As mentioned above, in some cases the amount of oxygen can be limited to a sub-stoichiometric amount so that the oxidation temperature is lower than it would be with stoichiometric or excess oxygen. Combustion temperature can also be moderated by the flowrate of the cooling fuel gas.

The hot gases generated in the oxidation zone can continue to flow in the downstream direction through the rubblized carbon ore. The available oxygen can be consumed by the oxidation occurring in the oxidation zone so that no more oxidation occurs downstream of the oxidation zone. However, the hot gases from the oxidation zone can heat rubblized carbon ore downstream of the oxidation zone to a temperature sufficient to cause pyrolysis of the carbon ore. Pyrolysis refers to the decomposition of components of the carbon ore caused by the high temperature. Some carbon ores can produce liquid and gaseous hydrocarbon products through pyrolysis. In some cases, the retort (pyrolysis) zone can be maintained or expanded with hot gas injection in between vessels since pyrolysis is endothermic, otherwise the retort zone may approach the temperatures of the oxidation zone resulting in a drop in yield regardless of whether there is oxygen breakthrough or not.

The process can be designed and controlled so that a zone of the rubblized carbon ore is held within a range of temperatures suitable for pyrolysis for a sufficient period of time to extract a desired amount of hydrocarbon products to leave a pyrolyzed carbon ore. The pyrolysis can occur in the absence of oxygen because the oxygen in the flowing gas is consumed in the oxidation zone. The zone of rubblized carbon ore that is at a temperature sufficient for pyrolysis, but which is not undergoing oxidation or combustion, is referred to as the "pyrolysis zone." Due to the continuous flowing of gas through the vessels, the pyrolysis zone can move downstream at the same rate as the oxidation zone. However, in some cases, one or both of the oxidation zone and pyrolysis zone can be allowed to grow or shrink to a degree as long as the zones remain intact (i.e. do not merge or disappear altogether). In such cases each zone can dynamically vary in size over time to moderate disruptions in processing conditions (e.g. recycling flow rates, gas flow rates, exhaust flow rates, product withdrawal flow rates, etc).

The present disclosure describes several zones in the rubblized carbon ore and these zones are described as moving in a downstream direction. It is noted that the rubblized carbon ore itself is substantially stationary during the process. Thus, motion of the zones does not refer to motion of the carbon ore. Rather, the motion of the zones refers to regions having a particular temperature or other property, and the regions having these particular properties can move in the downstream direction while the process is in operation. For example, the zone where oxidation is actively occurring is referred to as the oxidation zone. This zone can have a leading boundary and a trailing boundary. The leading boundary moves in the downstream as the oxidation reaction takes in additional carbon ore in the downstream direction. The trailing boundary moves in the downstream direction because cooling fuel gas flows into the trailing boundary at a cooler temperature, which cools the rubblized carbon ore behind the oxidation zone to a temperature below the oxidation temperature of the cooling fuel gas. Thus, the zone where oxidation is occurring moves in the downstream direction while the rubblized carbon ore remains stationary. It is also acknowledged that as materials are removed from the carbon ore via oxidation and pyrolysis some settling of the carbon ore will occur. Such settling and compacting of the carbon ore nonetheless qualifies as stationary since the materials are not circulating, or otherwise being actively withdrawn from the vessel during these stages.

It is also noted that the movement of the oxidation zone, pyrolysis zone, and other zones is usually not at the same velocity as the gas flowing through the rubblized carbon ore. Typically, the gases flowing through the rubblized carbon ore move at a higher velocity than the various zones, because of the relative masses and heat capacities of the gases and the solid carbon ore.

The methods described herein can be applied broadly to a range of carbon ores, such as oil shale, coal, oil sands, peat, natural graphite, gilsonite, tasmanite, synthetic hydrocarbon materials (e.g. plastic, rubber, polymers, etc), and other organic materials (e.g. municipal waste, industrial waste, biomass, etc). In the discussion to follow, reference to specific embodiments, arrangements, configurations, and results will be referenced specifically to experimental experience and derived considerations with oil shale, but in no way should limit practice of the invention to oil shale.

FIG. 1 is a flowchart illustrating an example method 100 of continuously recovering hydrocarbons from carbon ores. The method includes providing a first vessel containing rubblized carbon ore and a second vessel containing rubblized carbon ore, wherein a gas outlet of the first vessel is connected to a gas inlet of the second vessel to allow gas to flow from the first vessel to the second vessel, and wherein a gas outlet of the second vessel is connected to a gas inlet of the first vessel to allow a recycle gas to flow from the second vessel to the first vessel 110. The method also includes introducing a cooling fuel gas into the first vessel, wherein the cooling fuel gas comprises the recycle gas mixed with oxygen, wherein the recycle gas comprises hydrocarbons and oxidation products 120. The oxygen can be consumed through oxidation in an oxidation zone at an oxidation temperature in the first vessel, thereby producing a hot oxidation product gas at the oxidation temperature 130. Rubblized carbon ore can be heated in a pyrolysis zone downstream of the oxidation zone using the hot oxidation product gas, wherein the pyrolysis zone is at a pyrolysis temperature that is less than the oxidation temperature, thereby producing gaseous and vapor hydrocarbon pyrolysis products 140. Further, the vapor hydrocarbon pyrolysis products can be condensed on rubblized carbon ore in a condensing zone downstream of the pyrolysis zone, wherein the condensing zone is at a condensing temperature below a boiling point of the vapor hydrocarbon pyrolysis products 150. The method also includes collecting the condensed hydrocarbon pyrolysis products 160 and recycling a portion of the remaining gaseous hydrocarbons and oxidation products from the gas outlet of the second vessel as the recycle gas, wherein the oxidation zone and pyrolysis zone continuously move through the rubblized carbon ore in the downstream direction 170. The height of the vessels and the timing and spacing of said zones is designed such that periodically one vessel is cool and the ore can be turned around and replaced with fresh ore while all of the other zones are active in one or more vessels.

Figure 2:
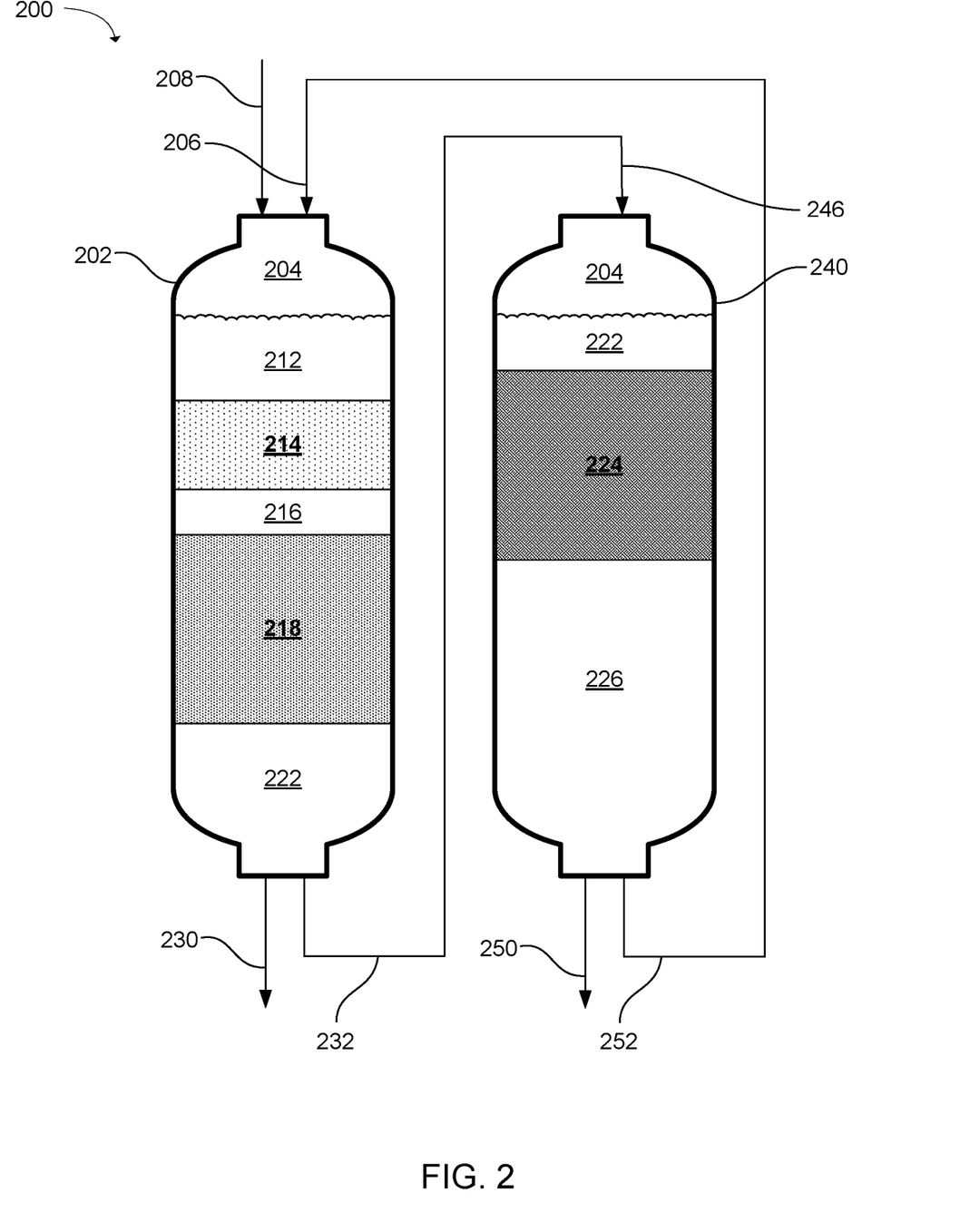
FIG. 2 is a schematic illustration of a system for continuously recovering hydrocarbons from carbon ores illustrating oxidation and pyrolysis zones progressively moving through a body of rubblized carbon ore in accordance with one example.

Methods of continuously recovering hydrocarbons from carbon ores can be performed using an example system 200 as shown in FIG. 2. This example system includes a first vessel 202 and a second vessel 240. Both of the vessels contain rubblized carbon ore with a head space 204 above the rubblized carbon ore. The rubblized carbon ore is shown divided into various zones 212, 214, 216, 218, 222, 224, and 226. The first vessel includes a gas outlet 232 that is connected to a gas inlet 246 of the second vessel. The second vessel also includes a gas outlet 252, which is connected to a gas inlet 206 of the first vessel so that recycle gas can flow from the second vessel to the first vessel. The first vessel also includes an oxygen inlet 208. Oxygen gas can flow into the first vessel and mix with the recycle gas in the head space above the rubblized ore bed. This is one way that oxygen can mix with the recycle gas to form a cooling fuel gas. In other examples, the oxygen gas and the recycle gas can be pre-mixed, and the mixture can be injected into the first vessel through a single common gas line.

The cooling fuel gas is thus introduced at the top of the vessel and flows in a generally downward direction through the first vessel. The cooling fuel gas flows first through a zone of cooled spent ore 212. Notably, the cooled spent ore 212 will not be present at initial startup. This is carbon ore that has already gone through the pyrolysis process and the oxidation process. In some examples, a majority of the original organic content of the carbon ore can be removed by pyrolysis and oxidation so that the spent ore includes mostly inorganic material. In some cases, the spent ore can be a porous mineral matrix. As mentioned above, the cooling fuel gas can include oxygen and recycle gas from the second vessel. The recycle gas can include non-condensable gas product from the gas outlet 252 of the second vessel 240. This can include unburned hydrocarbons (i.e. pyrolysis product) and oxidation products which can collectively include species such as $CO_2$, CO, $H_2S$, SOx, and in some cases $H_2O$. This recycle gas can be mixed with oxygen gas (e.g. any oxidant gas or oxygen containing gas, such as cover air, enhanced air, etc.) to make the cooling fuel gas that is introduced into the first vessel. In some examples, the cooling fuel gas can also include nitrogen gas, while in other examples the cooling fuel gas can be substantially nitrogen-free. In further examples, additional additives can be added to the cooling fuel gas, such as hydrogen gas, methane, ethane, propane, water, and the like. Generally the gaseous flow rates are governed by pressure drop and blower horsepower considerations, whereas temperature control can be governed by the oxygen flow. Furthermore, carbon dioxide (e.g. produced gas) can be used to adjust oxygen concentrations via dilution. As a general guideline, gaseous flow rates can be the result of pressure drop and blower horsepower ratings, while temperature can be controlled by oxygen flow rates.

The temperature of the spent ore increases in a downward direction in the first vessel 202, until at some point the temperature is above the oxidation temperature of the cooling fuel gas. At this point, the hydrocarbonaceous component of cooling fuel gas begins to oxidize. This point marks a beginning of an oxidation zone 214, which is a zone of the rubblized carbon ore in which oxidation is occurring. The oxidation can convert hydrocarbons in the cooling fuel gas and/or organic material in the rubblized carbon ore into heat and oxidation products. In some examples, carbon ore that has already gone through the pyrolysis process can include some residual organic content, such as coke. This residual coke can be completely or partially consumed in the oxidation zone. Oxidation of residual coke on spent shale is favored when the heating value of the hydrocarbonaceous gas is reduced. Thus, the relative mix of oxidation fuels (gaseous or solid) can be conveniently controlled by dilution of the hydrocarbonaceous gas with non-contributing components such as $CO_2$ and/or $H_2O$.

The rubblized carbon ore in the oxidation zone 214 can be at an oxidation temperature. More specifically, the oxidation zone 214 can be within an oxidation temperature range in which temperature follows a bell-shape curve with a trailing edge rising above the prior cool zone at the initial oxidation temperature, and the leading edge blending into the temperature of the pyrolysis zone as the oxygen is depleted. Further, the combustion zone can often start at a top of the vessel with an initiation temperature where heat is being released by the oxidation reactions. The temperature can generally increase moving down until a point where the oxygen is substantially depleted and oxidation is effectively complete. The maximum temperature may be considered the end of the combustion zone, although the combustion zone can effectively extend slightly where there is still a limited amount of oxidation occurring. In some examples, the oxidation temperature can be controlled by adjusting the concentration of oxygen in the cooling fuel gas. The concentration of oxygen can be maintained at a sub-stoichiometric concentration, which can result in an oxidation temperature that is below a normal stoichiometric combustion temperature. The term "stoichiometric concentration" refers to a concentration of oxygen that would allow the unburned hydrocarbons in the cooling fuel gas and the residual organic material in the rubblized carbon ore in the oxidation zone to fully react in an oxidation reaction with the oxygen, without having excess oxygen. In some cases, the stoichiometric concentration can be about 3 times (300%) of the concentration of the fuel gas, depending on a heating value of the fuel. In certain examples, the desired concentration of oxygen can be from about 0.5% to about 5%, or from about 2% to about 5%, by volume. With a sub-stoichiometric concentration of oxygen, the oxidation temperature can be controlled from about 600° F. to about 1500° F. In certain examples, the oxidation temperature can be controlled from about 650° F. to about 1200° F., from about 700° F. to about 1200° F., from about 800° F. to about 1000° F., from about 850° F. to 950° F., or from about 900° F. to about 1000° F. These temperature limits can vary based on vessel material limitations, controlling desirable product concentrations and undesirable by-product production, and desired rates of movement of each zone and produced gaseous products through the vessels. Further, below about 5% oxygen by volume, backflashes and uncontrolled combustion can be avoided and functions as a safety limit.

The heat generated in the oxidation zone can be sufficient to drive the pyrolysis process in the first and/or second vessel. Hot oxidation gas is generated in the oxidation zone. The hot oxidation product gas can include oxidation products and unburned hydrocarbons. In a typical example, the oxygen that was in the cooling fuel gas can be substantially consumed in the oxidation zone, so that the hot oxidation gas flowing downstream from the oxidation zone is oxygen-free. Unburned hydrocarbons (including some $H_2$ and $H_2S$) remaining in the hot oxidation gas can be from about 50% to about 99% of the original hydrocarbon content of the cooling fuel gas, or from about 80% to about 99% of the original hydrocarbon content in some examples, and most often 70% to 90%. However, heating value of unburned hydrocarbons may, in some cases, fall below 50% of the original pyrolysis gas not exposed to oxygen. The hot oxidation gas flows downstream and heats the rubblized carbon ore downstream from the oxidation zone.

As an example, FIG. 2 shows a pyrolysis zone 218 downstream of the oxidation zone 214. The pyrolysis zone is a region of the rubblized carbon ore that is at a temperature sufficient to cause pyrolysis of organic material in the rubblized carbon ore. Liquid and gaseous hydrocarbon products can be produced through pyrolysis in this zone. In the particular example shown in FIG. 2, a buffer zone of pyrolyzed ore 216 separates the pyrolysis zone from the oxidation zone. This zone includes rubblized carbon ore that has undergone pyrolysis to the point that organic matter is no longer being broken down by pyrolysis (i.e., substantially all hydrocarbon products that can be produced from the ore at the pyrolysis temperature and conditions have already been removed). Further, in this buffer zone the hot oxidation product gases and other gases are depleted of oxygen, and generally free of oxygen. However, the leading boundary of the oxidation zone has not yet reached the pyrolyzed ore in this zone. In some examples, the pyrolysis zone and the oxidation zone can be separated by a buffer zone in this way, so that individual particles of rubblized carbon ore are not subjected to pyrolysis and oxidation or oxidation temperatures above desired retort temperatures simultaneously.

Regardless, the pyrolysis zone can be at a pyrolysis temperature that is less than the oxidation temperature but which is sufficient to support pyrolysis. In some examples, the pyrolysis temperature can be from about 500° F. to about 1200° F., or from about 600° F. to about 1100° F., or from about 650° F. to about 950° F., or at least 600° F. During pyrolysis in the pyrolysis zone, the hot oxidation gas from the oxidation zone transfers heat to drive pyrolysis but the unburned hydrocarbons in the hot oxidation gas are largely unreacted in this zone due at least partially to the absence of oxygen. Pyrolysis products can include additional hydrocarbon product in the form of gaseous hydrocarbons and liquid hydrocarbons. Thus, the gases flowing downstream from the pyrolysis zone can include a mixture of gaseous hydrocarbons (including newly formed hydrocarbons mixed with previously formed unburned hydrocarbons), $CO_2$, CO, $H_2O$, and $H_2S$. Liquid hydrocarbons may also be produced in the pyrolysis zone, and these liquid hydrocarbons can also flow downward through the vessel.

The pyrolysis zone and the oxidation zone can vary in size based on depending on a variety of variables, including the size of the vessel, flow rate of the cooling fuel gas into the vessel, concentration of oxygen in the cooling fuel gas, startup procedures, organic content of the rubblized carbon ore, oxidation temperature, and pyrolysis temperature. In some examples, the oxidation zone has an oxidation zone depth (measured from the leading boundary of the oxidation zone to the trailing boundary of the oxidation zone) which is maintained within 10% of a target oxidation zone depth as the oxidation zone migrates through the rubblized carbon ore. Similarly, the pyrolysis zone can have a pyrolysis zone depth which is maintained within 10% of a target pyrolysis zone depth as the pyrolysis zone migrates through the rubblized carbon ore. In some examples, the depth of the pyrolysis zone can be expanded by intermediate heating of gas between vessels. Although not always required, in some examples, the oxidation zone and the pyrolysis zone are separated by a buffer zone at substantially the same temperature as the trailing edge of the pyrolysis zone.

Subsequent to pyrolysis but before oxidation, as a general guideline, the spent carbon ore can have a reduced carbon content which is from about 10% to about 40% of an initial carbon content in the body of rubblized carbon ore, and in other cases the reduced carbon content is from about 20% to about 30% of the initial carbon content. However, these ranges can vary based on the type of carbon ore. For example, for some types of coal the residual carbon can be in excess of 40%, while paraffin plastics can have residual carbon approaching 0%. In some examples, the movement speed of the pyrolysis zone through the body of rubblized carbon ore can be controlled by adjusting the flow rate of cooling fuel gas into the vessel and the concentration of oxygen in the cooling fuel gas. The movement speed can be controlled so that carbon ore particles have a sufficient residence time in the pyrolysis zone to produce a desired amount of hydrocarbon products from the particles. In certain examples, the average residence time of carbon ore particles in the pyrolysis zone can be from about 1 hour to about 24 hours, or from about 2 hour to about 20 hours, or from about 3 hours to about 12 hours, or from about 8 hours to about 24 hours.

The pyrolysis zone products then pass into a preheating zone 222 which has not yet reached pyrolysis temperatures. The rubblized carbon ore in the preheating zone is preheated and dried by the higher temperature pyrolysis zone products leaving the pyrolysis zone. As raw carbon ore is heated, the pyrolysis zone products are simultaneously cooled. At some point, the pyrolysis zone products are cooled sufficiently that vapor hydrocarbon components condense out of the gas stream. Condensation occurs throughout a condensing zone 224 that is downstream of the preheating zone. The condensed liquids can include hydrocarbons and water. These condensed products can combine with liquid hydrocarbons that were produced in the pyrolysis zone, forming a liquid product stream. Although in some cases, the condensing zone can be in the first vessel. In such cases, the first vessel can have a length sufficient to accommodate the oxidation zone, pyrolysis zone, and condensation zone for at least a portion of the process.

In the example shown in FIG. 2, the condensing zone is in the second vessel 240. In this example, liquid hydrocarbons produced in the pyrolysis zone are removed from the first vessel as a first liquid stream 230 and the condensed liquids from the condensing zone are removed from the second vessel as a second liquid stream 250. After all condensable liquids have been removed from the gas flow, the remaining gases can continue to flow downstream through the second vessel. The gas can flow through a cold raw ore zone 226, which can further cool the gas. After the gas reaches the bottom of the second vessel, the gas can be recycled from the gas outlet 252 of the second vessel to the gas inlet 206 of the first as the recycle gas mentioned above. The rubblized carbon ore in the cold raw ore zone can be at a temperature well below the pyrolysis temperature and also below the boiling points of the condensable liquids that condensed out in the condensing zone. In some examples, the cold raw ore zone can be at a temperature from about 40° F. to about 200° F., or from about 40° F. to about 180° F., or from about 70° F. to about 180° F. Therefore, in some examples the recycle gas can be at the same temperature as the cold raw ore zone. As mentioned above, the recycle gas can be mixed with oxygen gas to form the cooling fuel gas that is introduced into the first vessel. The oxygen gas can be at ambient temperature in some examples. In certain examples, the cooling fuel gas can have a temperature from about 40° F. to about 600° F. and in some cases to about 200° F. when the cooling fuel gas is introduced into the first vessel.

Figure 3:
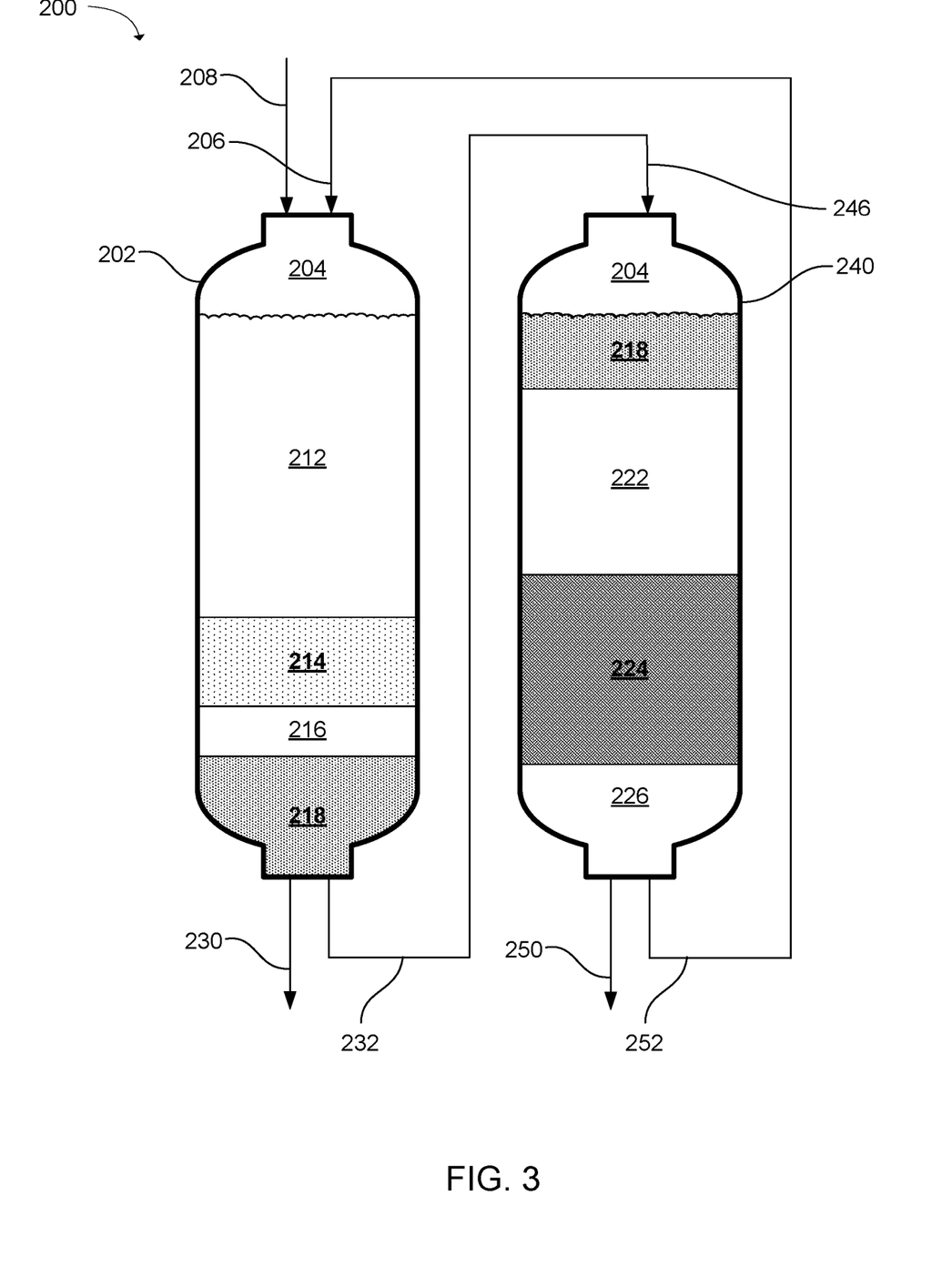
FIG. 3 is a schematic illustration of another system for continuously recovering hydrocarbons from carbon ores in accordance with another example.

The various zones, including the oxidation zone, pyrolysis zone, condensing zone, and others, can gradually move in a downstream direction through the vessels. Because the gas outlet of the first vessel is connected to the gas inlet of the second vessel, when a zone reaches the outlet of the first vessel, the zone can move smoothly into the second vessel. FIG. 3 shows the same system 200 from FIG. 2, at a later point in time. At this point in time, the oxidation zone 214 has moved farther down toward the bottom of the first vessel 202. A much larger zone of cooled spent ore 212 is above the oxidation zone. The pyrolysis zone 218 has moved all the way to the bottom of the first vessel and has transitioned partially into the second vessel 240. The condensing zone 224 has moved farther down in the second vessel, but has not yet reached the bottom of the second vessel.

If the condensing zone reaches the bottom of the second vessel, then a third vessel can be connected in series with the second vessel. The condensing zone can then move into the third vessel. Additional vessels, such as a fourth vessel, fifth vessel, or more can be similarly added in series to accommodate the various zones in the process. The total amount of rubblized carbon ore in the vessels can be sufficient so that substantially all condensable hydrocarbons and water can be condensed and the gas flowing out the gas outlet of the last vessel can be recycled back to the first vessel as recycle gas, with the recycle gas being at a cool temperature as described above.

When the oxidation zone moves to the bottom of the first vessel, and the oxidation zone can then transition into the second vessel and begin burning residual organic material in the rubblized carbon ore at the top of the second vessel. Once the oxidation zone has fully moved out of the first vessel and the spent ore in the first vessel has sufficiently cooled, the inlets and outlets of the first vessel can be disconnected and the spent ore can be emptied from the first vessel. The first vessel can then be refilled with fresh carbon ore, ready to be reconnected in series with the other vessels as the process continues. When the first vessel is disconnected, the flow of recycle gas and oxygen can be transferred to the inlet of the second vessel. Thus, the second vessel can go through the same process as the first vessel. A third vessel can be connected in series with the second vessel, and the recycle gas can come from the gas outlet of the third vessel. This process can be repeated indefinitely, and after each vessel has gone through the pyrolysis and oxidation process, the vessel can be disconnected, emptied, and refilled.

Figure 4:
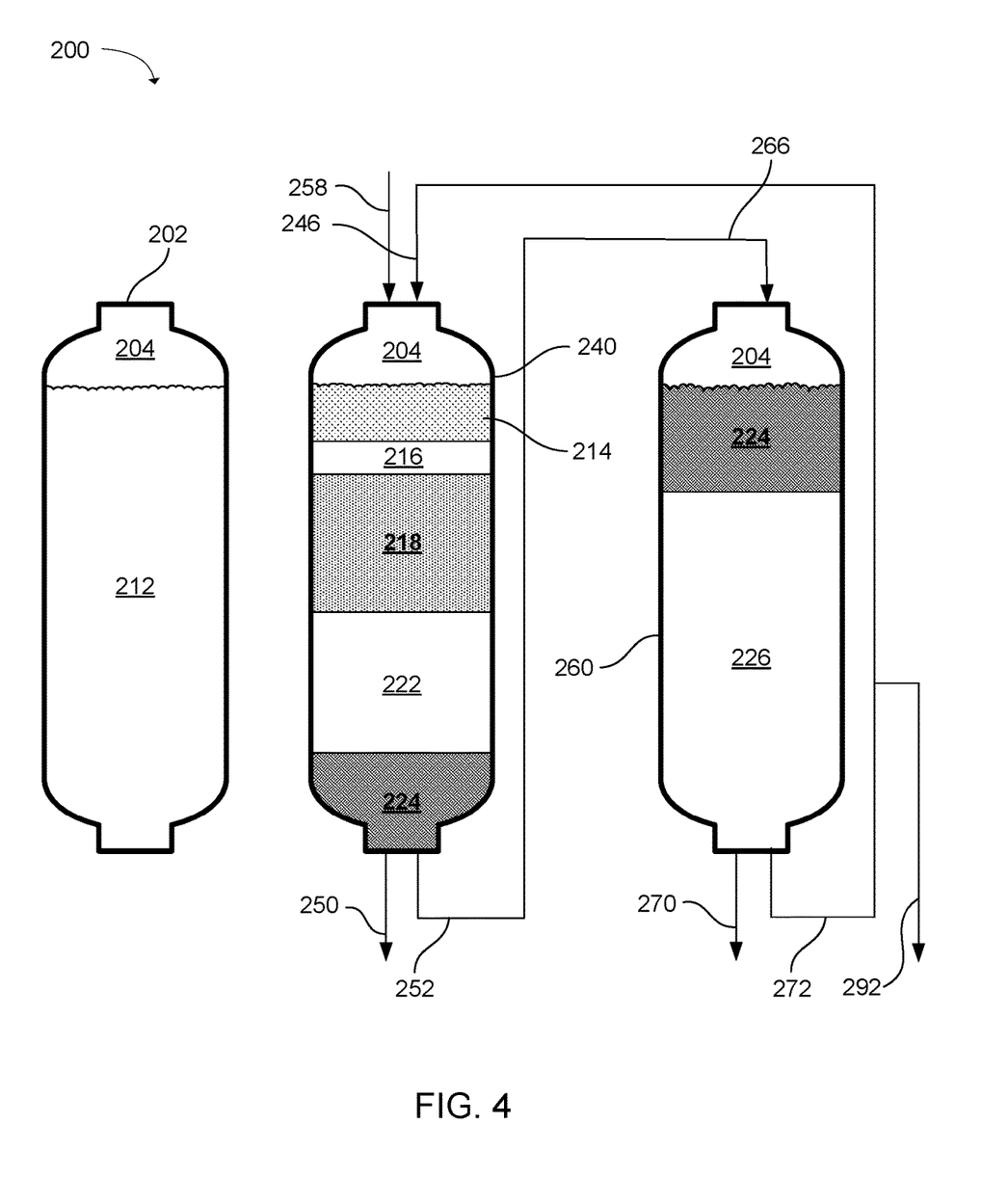
FIG. 4 is a schematic illustration of another system for continuously recovering hydrocarbons from carbon ores in accordance with another example.

FIG. 4 shows the system 200 after the oxidation zone 214 has moved completely out of the first vessel 202 into the second vessel 240. The entire first vessel is now filled with cool spent ore 212. Therefore, the inlets and outlets of the first vessel have been disconnected so that the first vessel can be emptied and refilled with fresh carbon ore. A third vessel 260 has been connected to the second vessel. The gas outlet 252 of the second vessel is connected to the gas inlet 266 of the third vessel. The gas outlet 272 of the third vessel is connected to the gas inlet 246 of the second vessel so that gas is recycled from the third vessel to the second vessel. The process continues with the second and third vessels, just as with the first and second vessels previously. Liquids are collected from liquid outlets 250 and 270 at the bottoms of the second and third vessels. Oxygen can also be introduced into the second vessel through an oxygen inlet 258.

As another example, this cycle can be maintained using from two to six or more vessels, and in one example three to four vessels. Each zone can be adjusted in size based on the vessel size via adjustment of inlet flow rates, temperatures, and outlet flow rates. As an example, if a two vessel system were used, each of the oxidation zone 214, buffer zone 216, pyrolysis zone 218, preheating zone 222, and condensing zone 224 can be sufficiently narrow in order to allow removal of spent ore 212 from the first vessel while the zones progress through the second vessel.

An optional side draw 292 can be used to remove excess gaseous hydrocarbons and oxidation products. Flow rates of removed excess gaseous products can be the difference between produced gas and consumed gas.

In certain examples, the process described herein can be performed using a system that includes multiple vessels arranged in a circular pattern surrounding a central equipment stack. The central equipment stack can include valves to direct gas flow between the vessels. For example, the valves can direct oxygen and recycle gas into a first vessel. Gas from a gas outlet of the first vessel can be directed to a second vessel. If additional space for the process is to be used, then gas from an outlet of the second vessel can be directed to a third vessel. The gas from the outlet of the third vessel can be recycled back to the first vessel. At the same time, a fourth vessel can be in the process of being emptied and refilled with fresh carbon ore. Once the carbon ore in the first vessel has been fully processed, the first vessel can be disconnected. The fourth vessel can be connected in series with the second and third vessels while the first vessel is emptied and refilled. The valves of the central equipment stack can be reconfigured to direct gas flow from the second vessel to the third vessel, then to the fourth vessel, and then recycled back to the second vessel. These connections can be maintained through piping and high temperature valves. Additionally, equipment to provide for adjustment of the recycle gas temperature (heating or cooling) can be included. Location of the central stack inside the circular vessel arrangement has several advantages related to minimized pipe lengths and physical footprint, but other configurations of the vessels and equipment can also be used.

Figure 5:
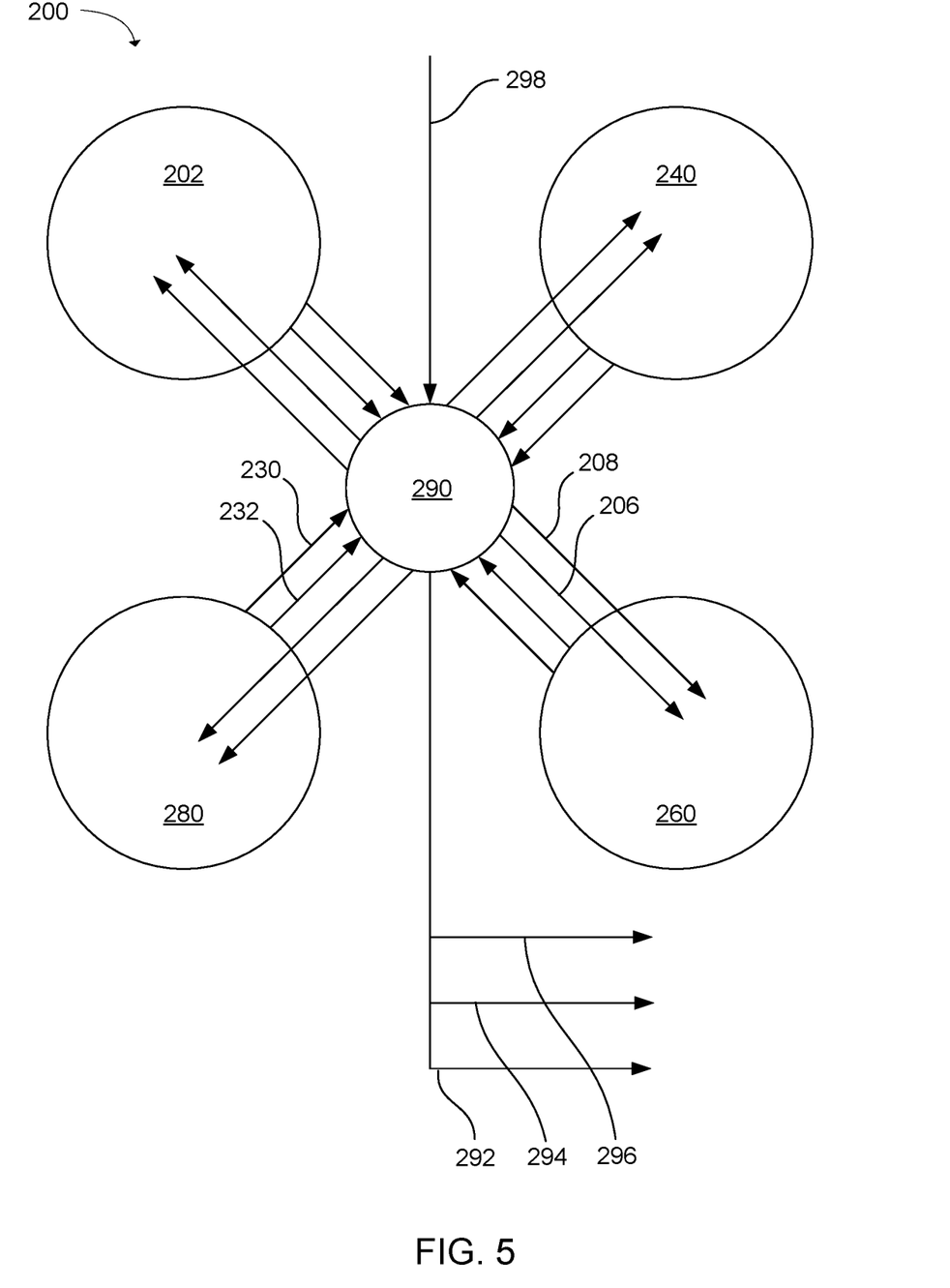
FIG. 5 is a schematic illustration of yet another system for continuously recovering hydrocarbons from carbon ores in accordance with another example.

FIG. 5 shows a top-down schematic view of an example system that includes a central equipment stack 290 and four vessels 202, 240, 260, 280. Each vessel includes an oxygen inlet 208, a gas inlet 206, a liquid outlet 230, and a gas outlet 232. These are connected to the central equipment stack, which includes valves (not shown) that can be selectively turned on and off to direct the flow of oxygen, recycle gas, gas effluents from the vessels, and liquid effluents from the vessels. For example, oxygen gas and recycle gas can be directed into the inlets of a first vessel and the gas effluent from the gas outlet of the first vessel can be directed to flow into the gas inlet of a second vessel, as shown in FIG. 2.

After operating in this way for a period of time, the valves can be switched so that the gases flow in the arrangement shown in FIG. 3. In some examples, one of the vessels at a time can have the inlet and outlet valves shut off so that spent ore can be emptied from the vessel and the vessel can be refilled with fresh carbon ore. Cool fuel gas can be moved from the cool bed to a desired vessel containing the oxidation zone using conventional blowers or compressors. The process of producing hydrocarbons from the carbon ore can be performed continuously using the system shown in FIG. 5, with each vessel being emptied and refilled with fresh ore after the pyrolysis and oxidation process have been completed in that vessel.

This system also includes an oxygen line 298 that is connected to an oxygen supply. The oxygen line provides oxygen gas to the central equipment stack, and the valves in the central equipment stack can be used to direct the oxygen to the appropriate vessel. The system also includes a gas collection line 292, a liquid hydrocarbon collection line 294, and a water collection line 296. The liquids collected from the vessels can be separated into liquid hydrocarbons and water to be collected through these collection lines. Excess gas that is not redirected to the vessels can be collected through the gas collection line. This gas can include burnable hydrocarbons that can be used to generate electricity or heat, or as a feedstock for the production of chemicals, or hydrogen production, or as a gaseous fuel, or for another beneficial purpose.

The examples described above have illustrated methods of recovering hydrocarbons when the process is running continuously. As explained above, the process can have some characteristics of batch processes and some characteristics of fully-continuous processes. The solid carbon ore can be emptied from vessels and refilled into vessels at discrete times, which is similar to a batch process. However, the flow of cooling fuel gas, oxygen, and gaseous and liquid product streams can be continuous. Thus, the process is continuous with respect to gas flow, liquid flow, and the movement of thermal zones through the vessels.

Although the methods described herein can run continuously once the process has been started, in some examples a startup phase can be used to begin the process. The startup phase can include heating a vessel filled with cold carbon ore in order to form a pyrolysis zone and an oxidation zone. Startup may be accomplished with a single vessel, two vessels, or more than two vessels. In some examples, the startup phase can include introducing an oxygen-free heating gas into a first vessel to form a pyrolysis zone. The heating gas can include gases such as nitrogen, carbon dioxide, unburned hydrocarbons, and so on. In certain examples, the heating gas can be excess gas produced by another similar carbon ore processing system that is already in operation. The heating gas can be at or above the desired pyrolysis temperature.

Figure 6:
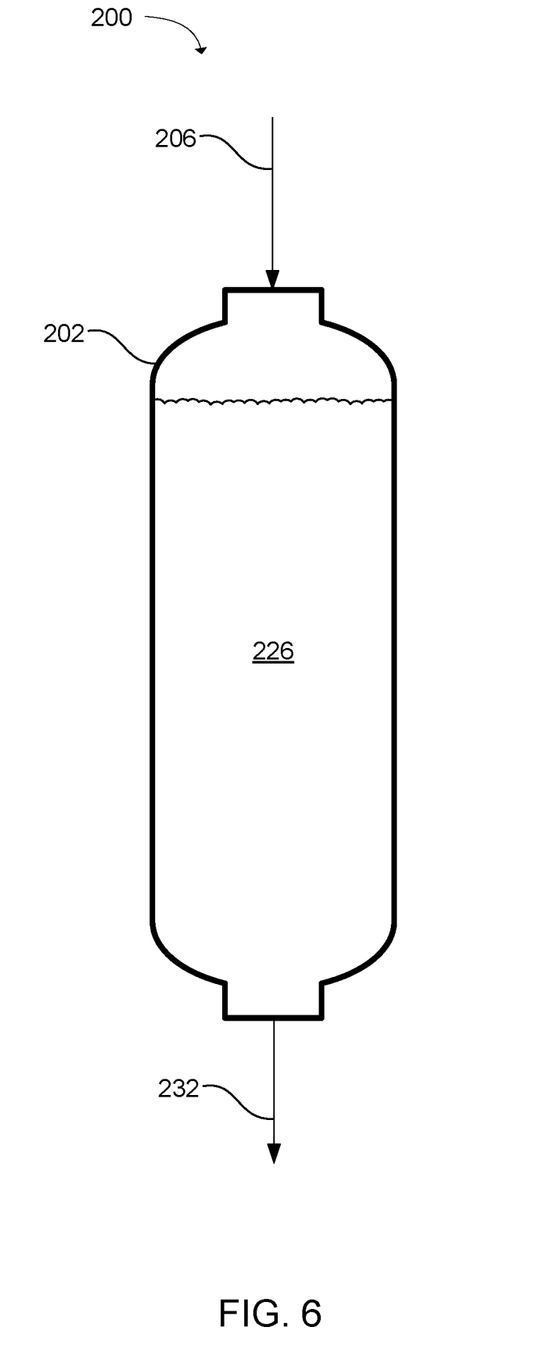
FIG. 6 is a schematic illustration of still another system for continuously recovering hydrocarbons from carbon ores in accordance with another example.
Figure 7:
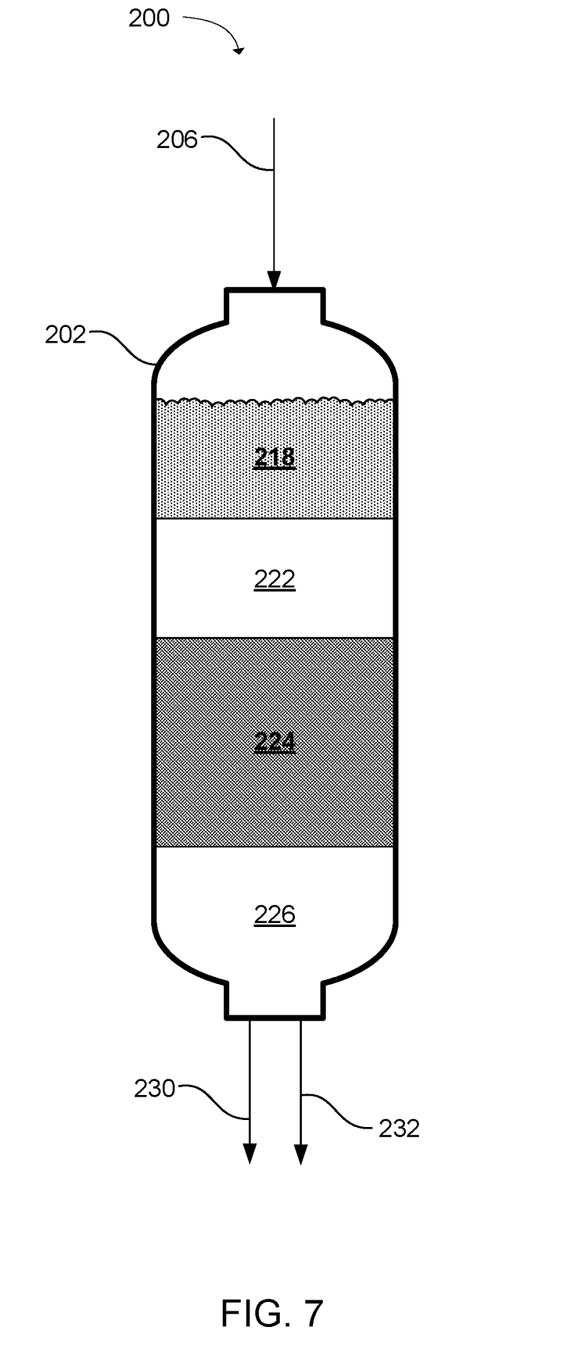
FIG. 7 is a schematic illustration of another system for continuously recovering hydrocarbons from carbon ores in accordance with another example.

Over time, carbon ore in a region at the top of the first vessel (assuming the direction of flow of the heating gas is top-down) can be heated to the pyrolysis temperature and gaseous and liquid hydrocarbon products can begin to be produced from the carbon ore by pyrolysis. This is illustrated in FIGS. 6 and 7. FIG. 6 shows a vessel 202 filled with cold rubblized carbon ore 226 at the beginning of the startup phase. A heating gas is introduced through the gas inlet 206. The gas exits through the gas outlet 232, at a cooler temperature after passing through the bed of cool rubblized carbon ore. If desired, the gas can be reheated and recycled to the gas inlet or used in another way. The heating gas can be heated by any convenient method such as using a burner, furnace, heat exchanger, and so on. FIG. 7 shows the vessel after a period time, when a pyrolysis zone 218 has formed. This zone includes carbon ore that has reached the pyrolysis temperature and from which liquid and gaseous hydrocarbons are actively being produced. A condensing zone 224 also forms farther down in the vessel, where the carbon ore is still cool enough to condense hydrocarbons and water vapor. Liquid hydrocarbons and water are collected from a liquid outlet 230 at the bottom of the vessel.

At a point during the process the condensing zone can move downward and reach the bottom of the first vessel. At this point, the gas effluent from the first vessel can be redirected to a gas inlet of a second vessel filled with cold carbon ore so that any remaining vapors can be condensed in the second vessel. The condensing zone can then move into the second vessel as explained above.

Figure 8:
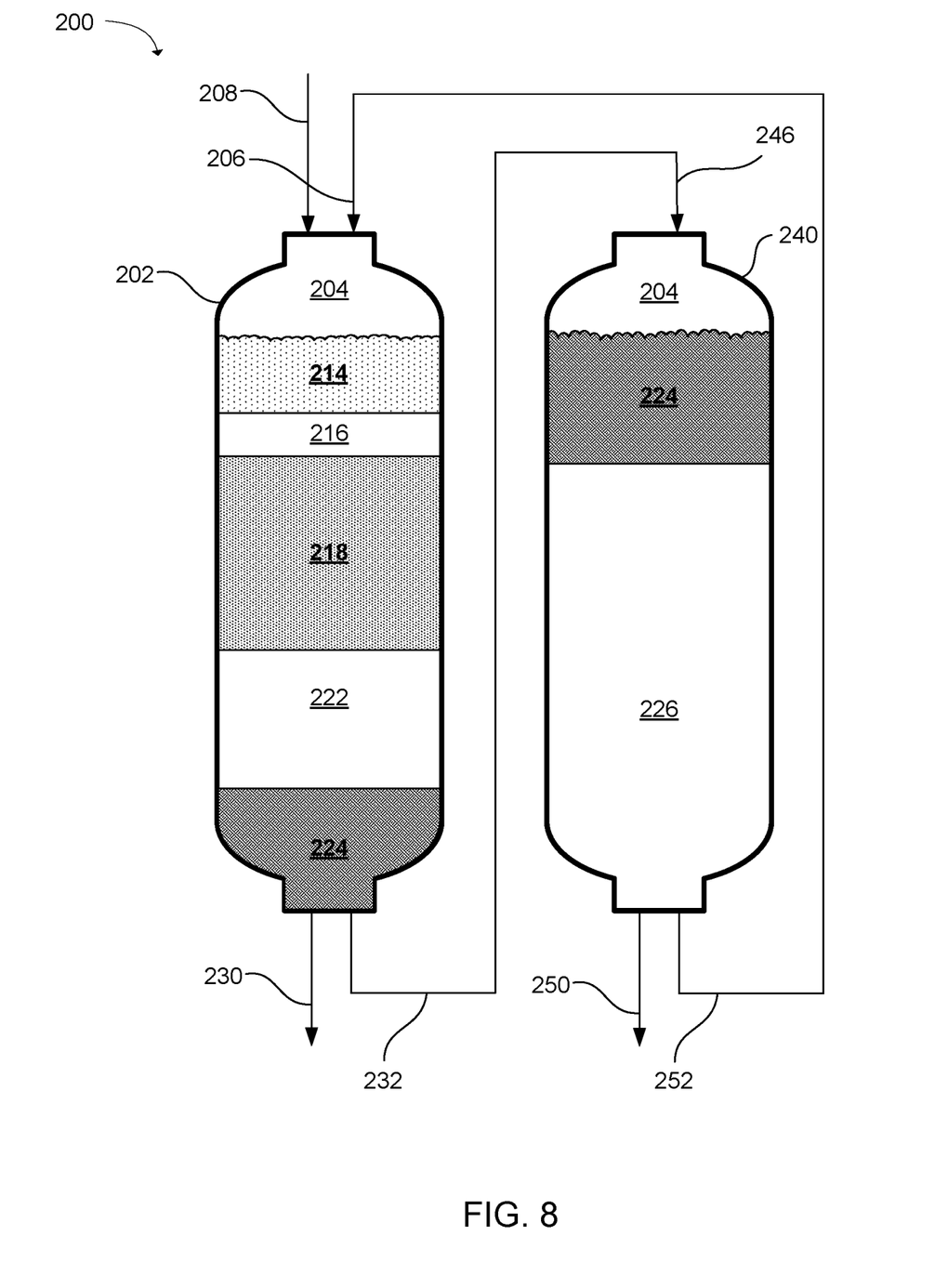
FIG. 8 is a schematic illustration of another yet system for continuously recovering hydrocarbons from carbon ores in accordance with another example.

The pyrolysis zone can also move downward through the first vessel. Once the carbon ore at the top of the vessel has completed pyrolysis (meaning that a desired amount of organic content in the carbon ore has been converted to gaseous and liquid hydrocarbons) then an oxidation zone can be formed. FIG. 8 shows the beginning of formation of an oxidation zone 214 at the top of the first vessel 202. The oxidation zone can be formed by switching from introducing the oxygen-free heating gas to introducing a cooling fuel gas that includes oxygen and burnable hydrocarbons. In this example, the oxygen is supplied through an oxygen inlet 208 and the hydrocarbons are provided by recycle gas through a gas inlet 206. The hot carbon ore that has gone through the pyrolysis process can be at temperatures that support oxidation of the cooling fuel gas. Therefore, the cooling fuel gas can begin to burn when it comes in contact with the hot carbon ore. This can form an oxidation zone that also moves gradually downward through the rubblized carbon ore. As explained above, the oxidation temperature in the oxidation zone can be controlled by adjusting the oxygen concentration in the cooling fuel gas.

It is noted that the examples shown in the figures include vessels that are oriented vertically. However, the methods described herein can be performed with vessels having any orientation, such as vertical, horizontal, or inclined. Additionally, the direction of flow of gases through the vessels is depicted as being in a top-down direction in the examples shown in figures. However, the methods described herein can also be performed with a different direction of flow. In some examples, gases can flow from the bottoms of the vessels toward the tops of the vessels. In such cases, the zones will progressively move upward toward the respective outlets. In other examples, gases can flow from one side to another, such as in horizontal vessels. If inclined vessels are used, gases can flow from an upper end of the vessel to a lower end or from a lower end to an upper end. The direction of gas flow can be the same as the direction of movement of the various zones, such as the oxidation zone and pyrolysis zone. Liquids can flow in a downward direction under the force of gravity. Therefore, it can be useful to have a liquid outlet at or near a bottom of the vessels. In certain examples, it can also be useful to have the direction of gas flow in a top-down direction because this can result in cooler regions of the carbon ore being lower in the vessel, and condensed liquids can flow downward under the force of gravity through the cooler regions without being re-vaporized.

Raw carbon ores can be mined and obtained from a variety of sources. Non-limiting examples of raw carbon ores can include both natural and synthetic materials such as, but not limited to oil shale, oil sands, coal, peat, graphite, gilsonite, tasmanite, bitumen, biological materials (plant or animal based biomass), and synthetic organics (oil or natural gas derived products including plastics, municipal waste, refinery products and residuals), either individually or in combination. In any event, sufficient permeability of the bed can allow for sufficient flow of gas consistent with ratings of the blower/compressor equipment installed.

The rubblized carbon ore being heated can maintain a sufficient permeability to allow gas transport through the body of rubblized carbon ore throughout the process of preheating and pyrolysis. In particular, the rubblized carbon ore can maintain a sufficient permeability to allow gas transport of the gaseous and vapor hydrocarbon products that are produced during pyrolysis. Some types of carbon ore can have inherent porosity. Mineral materials such as oil shale can include a rigid mineral structure that has porosity including pores that are internal in individual particles of the material, or void spaces between rigid particles of the material, or a combination thereof. Other types of carbon ore may not have inherent porosity. For example, some types of biomass or waste material can consolidate and may not have sufficient porosity when used alone. In certain examples, biomass or waste material can be mixed with a mineral material such as oil shale. The mineral structure of the oil shale can survive the pyrolysis process and the mineral structure can maintain the porosity of the body of carbon ore. Any other carbon ore materials that may not have sufficient porosity can likewise be mixed with a secondary carbon ore material that has a mineral structure that can survive the pyrolysis process. Thus, the combined body of carbon ore can maintain sufficient porosity to allow gas transport of gas and vapor hydrocarbon products during pyrolysis.

Raw oil shale can be obtained and rubblized to a desired particle distribution and size. Kerogen content in raw oil shale can vary depending on the particular formation source from which it is mined. Similarly, mineral content and other composition variables can vary considerably among different raw oil shales. However, as a very general guideline, the initial kerogen content is greater than 5% by weight. In some cases the initial kerogen content can be greater than 50% such as when treating raw oil shale. Alternatively, this process can be applied to hydrocarbonaceous products having a lower initial kerogen content such as from 5% to 50% by weight, and in some cases 5% to about 35% by weight.

The body of rubblized carbon ore can be substantially stationary before and during processing aside from settling and subsidence during pyrolysis and oxidation. More particularly, this process is distinguished from processes in which carbon ore is continuously mixed, e.g. fluidized beds, or moving beds passed through a zone or retort.

The cooling fuel gas can be prepared by mixing the recycle with oxygen prior to introduction into the vessel. Alternatively, the cooling fuel gas can be prepared by mixing the recycle gas with oxygen within an upper headspace of the vessel above the body of rubblized carbon ore. In either case, it is desirable that the recycle gas and oxygen are homogeneously mixed prior to passing into the body of rubblized carbon ore and contacting a region above the oxidation temperature of the gas mixture.

The oxygen that is mixed with the recycle gas can be in the form of air, oxygen-enriched air, pure oxygen, or another mixture including oxygen. In certain examples, pure oxygen can be provided from an oxygen tank. In other examples, pure oxygen, nearly pure oxygen, or oxygen-enriched air can be provided by a pressure swing oxygen generator or oxygen concentrator.

During processing temperature profiles throughout the vessels can provide valuable feedback for controlling operation of the process. Accordingly, in one example, the method can include actively monitoring at least one of an outlet temperature, an oxidation zone temperature, and a pyrolysis zone temperature in order to dynamically adjust at least one of the inlet mass flow rate, the inlet temperature, and the inlet oxygen concentration. As a specific example, the actively monitoring can include use of at least one temperature sensor associated with an internal surface of the vessel or the rubblized carbon ore bed.

The specific composition of the cooling fuel gas can vary. In one example, the cooling fuel gas is substantially free of nitrogen. In another example, the inlet oxygen concentration is non-zero and less than 5% by volume such that oxygen is a limiting reagent for oxidation so as to also maintain the low oxidation temperature. Maintaining a significant oxygen deficit also keeps the temperature in the oxidation zone well below typical combustion temperatures of up to 5000° F. since limited oxidation can only heat the surrounding gas to a limited temperature. In this manner, the oxidation zone temperature can be carefully controlled by limiting oxygen concentrations and inlet flow rates.

Although pressures can vary somewhat, most often the body of rubblized carbon ore can be maintained at an absolute pressure from about 0.8 atm to about 3 atm during oxidation and pyrolysis.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method of continuously recovering hydrocarbons from carbon ores, comprising:
   providing a first vessel containing rubblized carbon ore and a second vessel containing rubblized carbon ore, wherein a gas outlet of the first vessel is connected to a gas inlet of the second vessel to allow gas to flow from the first vessel to the second vessel, and wherein a gas outlet of the second vessel is connected to a gas inlet of the first vessel to allow a recycle gas to flow from the second vessel to the first vessel;
   introducing a cooling fuel gas into the first vessel, wherein the cooling fuel gas comprises the recycle gas mixed with oxygen, wherein the recycle gas comprises hydrocarbons and oxidation products;
   consuming the oxygen through oxidation in an oxidation zone at an oxidation temperature in the first vessel, thereby producing an hot oxidation product gas at the oxidation temperature;
   controlling the oxidation temperature of the oxidation zone by limiting an oxygen concentration in the cooling fuel gas;
   heating rubblized carbon ore in a pyrolysis zone downstream of the oxidation zone using the oxidation product gas, wherein the pyrolysis zone is at a pyrolysis temperature that is less than the oxidation temperature, thereby producing gaseous and vapor hydrocarbon pyrolysis products and a heated pyrolyzed carbon ore;
   condensing the vapor hydrocarbon pyrolysis products on rubblized carbon ore in a condensing zone downstream of the pyrolysis zone to form condensed hydrocarbon pyrolysis products, wherein the condensing zone is at a condensing temperature below a boiling point of the vapor hydrocarbon pyrolysis products;
   collecting the condensed hydrocarbon pyrolysis products; and
   recycling remaining gaseous hydrocarbons and oxidation products from the gas outlet of the second vessel as the recycle gas;
   wherein the oxidation zone and pyrolysis zone continuously move through the rubblized carbon ore in a downstream direction.

2. The method of claim 1, wherein the oxidation zone is at least partially within the first vessel and wherein the condensing zone is at least partially within the second vessel.

3. The method of claim 1, Wherein the gas outlet of the second vessel is connected to the gas inlet of the first vessel through at least one additional vessel connected in series with the first and second vessels.

4. The method of claim 3, Wherein the first vessel, second vessel, and at least one additional vessel are arranged in a circular pattern surrounding a central equipment stack, wherein the central equipment stack comprises valves to direct gas flow between the vessels.

5. The method of claim 1, further comprising controlling a concentration of oxygen in the cooling fuel gas at a concentration less than a stoichiometric concentration, wherein the stoichiometric concentration is with respect to a total amount of combustible fuel in the cooling fuel gas and combustible organic material in pyrolyzed carbon ore after the pyrolysis zone has moved through the pyrolyzed carbon ore.

6. The method of claim 5, Wherein the concentration of oxygen in the cooling fuel gas is from about 0.01% to about 5% by volume.

7. The method of claim 1, wherein the oxidation temperature is from about 600° F. to about 1500° F.

8. The method of claim 1, wherein the pyrolysis temperature is from about 500° F. to about 1100° F.

9. The method of claim 1, wherein the oxidation zone moves from the first vessel to the second vessel, and wherein the method further comprises, after the oxidation zone has moved from the first vessel to the second vessel, switching introduction of the cooling fuel gas to the gas inlet of the second vessel, emptying spent carbon ore from the first vessel, and refilling the first vessel with fresh carbon ore.

10. The method of claim 1, wherein the condensing zone moves to the gas outlet of the second vessel, and wherein the method further comprises connecting a third vessel containing rubblized carbon ore to the gas outlet of the second vessel so that the condensing zone moves from the second vessel to the third vessel.

11. The method of claim 1, further comprising a startup phase, at a beginning of which the rubblized carbon ore in the first and second vessels is at a temperature below the pyrolysis temperature, the startup phase comprising:
   introducing an oxygen-free heating gas into the first vessel to form the pyrolysis zone by heating the rubblized carbon ore in the pyrolysis zone to the pyrolysis temperature;
   after the pyrolysis zone has moved downstream, leaving an amount of pyrolyzed carbon ore upstream of the pyrolysis zone, switching from introducing the oxygen-free heating gas to introducing the cooling fuel gas; and
   forming the oxidation zone by oxidation of the cooling fuel gas in the heated pyrolyzed carbon ore.

12. The method of claim 1, wherein the cooling fuel gas is introduced at a temperature from about 40° F. to about 600° F.

13. The method of claim 1, wherein the heated pyrolyzed carbon ore is at least 600° F.

14. The method of claim 1, wherein a depth of the pyrolysis zone may be expanded by intermediate heating of gas between vessels.

15. The method of claim 1, wherein the oxidation products in the cooling fuel gas comprise carbon dioxide, carbon monoxide, water vapor, and wherein the cooling fuel gas further comprises one or more of hydrogen, methane, ethane, and propane.

16. The method of claim 1, wherein the carbon ore comprises a solid capable of decomposing to liquid and gaseous hydrocarbons at a temperature greater than 500° F.

17. The method of claim 1, wherein the carbon ore comprises oil shale, oil sands, coal, bitumen, gilsonite, tasmanite, plastic, rubber, municipal waste, industrial waste, biomass, polymers, or a combination thereof.

18. The method of claim 1, wherein during heating the carbon ore maintains sufficient porosity to allow gas transport of the gaseous and vapor hydrocarbon pyrolysis products, wherein the porosity is either or both: inherent in a mineral structure of the carbon ore and maintained via a secondary carbon ore.

19. The method of claim 1, wherein the cooling fuel gas is injected into the first vessel by injecting the oxygen and the recycle gas separately into a headspace of the first vessel above the rubblized carbon ore.

20. The method of claim 1, further comprising actively monitoring an outlet temperature, an oxidation zone temperature, a pyrolysis zone temperature, or a combination thereof and dynamically adjusting an inlet flow rate of the cooling fuel gas, an inlet temperature of the cooling fuel gas, an inlet oxygen concentration of the cooling fuel gas, or a combination thereof in response to a measured temperature of at least one of the outlet temperature, the oxidation zone temperature, and the pyrolysis zone temperature.

21. The method of claim 1, wherein the rubblized carbon ore has a residence time in the pyrolysis zone from about 0.1 hour to about 24 hours.

22. The method of claim 1, further comprising condensing water vapor in the condensing zone and collecting the condensed water for use or disposal.

23. The method of claim 1, further comprising using excess hydrocarbon gases produced by pyrolysis for generation of heat or electric power, or as a feedstock for the production of chemicals, hydrogen, or gaseous filet.

24. The method of claim 1, wherein the oxidation temperature is controlled below a point where one or both of carbonate decomposition and $NO_x$ formation occurs.

25. The method of claim 1, wherein the oxygen in the cooling fuel gas is free of nitrogen such that the oxidation product gas is a nitrogen free stream of carbon dioxide suitable for carbon dioxide capture and management.

26. The method of claim 1, wherein the first and second vessels are vertical or inclined vessels and wherein the downstream direction is from an upper end of the vessels to a lower end of the vessels.

* * * * *